Patented Feb. 3, 1948

2,435,443

UNITED STATES PATENT OFFICE 2,435,443

SEPARATION OF GEM CYCLIC HYDROCARBONS FROM NONGEM CYCLIC HYDROCARBONS BY SELECTIVE DEHYDROGENATION

Vladimir N. Ipatieff and Herman Pines, Riverside, Ill., assignors to Universal Oil Products Company, Chicago, Ill., a corporation of Delaware No Drawing. Application April 17, 1944,
Serial No. 531,497

7 Claims. (Cl. 260—668)

This invention relates to the conversion of hydrocarbons and more particularly to the dehydrogenation of gem cyclic hydrocarbons.

By "gem" cyclic hydrocarbons we mean cyclic hydrocarbons having at least one carbon atom in the ring with two substituent groups attached thereto. Such hydrocarbons may comprise for example 1,1,3-trimethylcyclohexane and 1,1,2,3-tetramethylcyclohexane.

While the invention is particularly applicable to the conversion of alkyl cyclohexanes having at least one carbon atom in the ring with two alkyl groups attached thereto, and more particularly to poly-methylcyclohexanes of this structure, it is understood that the invention may be applicable to the conversion of other cyclic hydrocarbons, such as cyclohexenes, cyclohexadienes and polycyclic hydrocarbons dehydrogenatable to form polycyclic aromatics, having the gem structure.

The substituent groups usually will comprise methyl groups but it is understood that the invention may also be applicable to the treatment of gem cyclic hydrocarbons in which the substituent groups are other alkyl groups, such as ethyl, propyl, butyl, etc., or cyclo-alkyl groups, such as cyclopentyl, cyclohexyl, etc., and to mixtures of these substituent groups.

In a broad aspect the present invention relates to a process for converting a cyclic hydrocarbon having at least one carbon atom in the ring with two substituent groups attached thereto, which comprises subjecting said cyclic hydrocarbon to dehydrogenation.

In a specific embodiment the present invention relates to a process for converting a poly-alkyl-cyclohexane having at least one carbon atom in the ring with two alkyl groups attached thereto, which comprises subjecting said alkyl cyclohexane to dehydrogenation in the presence of a catalyst.

In another specific embodiment the present invention relates to a process for converting a poly-methyl cyclohexane in which at least one carbon atom in the ring is attached to two alkyl groups, which comprises subjecting said cyclohexane to dehydrogenation and demethylation in the presence of a catalyst at a temperature above about 275° C.

In accordance with the invention, a gem cyclic hydrocarbon may be subjected to dehydrogenation in the presence of a suitable dehydrogenating catalyst at a temperature adequate to dehydrogenate the saturated ring to form an aromatic ring. We have found that under these conditions, one of the substituent groups becomes detached from the cyclic hydrocarbon and the final product thus comprises an aromatic hydrocarbon containing one carbon atom less to the molecule than the gem cyclic hydrocarbon charged to the process.

The preferred catalyst comprises platinum or platinum-alumina and with these catalysts the temperature employed must be above about 275° C. Usually it will not be necessary to go to temperatures much above 400 or 500° C. Other suitable dehydrogenation catalysts, such as alumina or other satisfactory carriers composited with a compound and particularly an oxide of the elements in the left-hand columns of groups IV, V and VI of the periodic table, or mixtures thereof, and more particularly alumina-chromia or alumina-molybdena, may be employed within the scope of the present invention, but not necessarily under the same conditions of treatment and not necessarily with equivalent results.

As heretofore set forth, with platinum or platinum-alumina catalyst, the temperature employed must be above about 275° C. in order to convert the gem cyclic hydrocarbons. However, alkyl cyclohexane hydrocarbons not having the gem structure may be dehydrogenated at a lower temperature, and this method may be used as a means for separating gem cyclic hydrocarbons. This may be accomplished, for example, by subjecting a mixture of a cyclohexane having the gem structure and a cyclohexane not having the gem structure to dehydrogenation at a temperature below about 275° C. Under these conditions the cyclohexane not having the gem structure will be dehydrogenated to form an alkyl aromatic, while the cyclohexane having the gem structure will remain substantially unconverted. The aromatic may then readily be separated from the cyclohexane by conventional methods, such as fractionation and/or solvent extraction, etc.

The invention is further illustrated in the following examples. However, it is understood that the broad scope of the invention is not limited thereto.

*Example I*

1,1,3-trimethylcyclohexane was passed over 25 cc. of platinum-alumina catalyst at a rate of 7 cc. per hour at varying temperatures. At 230° C., no dehydrogenation was effected. At 280° C., 9% dehydrogenation occurred. At 300° C., 64% dehydrogenation was obtained. The product of dehydrogenation was analyzed and found to consist of meta-xylene.

Example II

A mixture of 1,1,2,3-tetramethylcyclohexane and 1-methyl-4-isopropylcyclohexane was subjected to dehydrogenation in the presence of a platinum-alumina catalyst at 230° C. Under these conditions, 1-methyl-4-isopropylcyclohexane underwent dehydrogenation to form para-cymene, while the 1,1,2,3-tetramethylcyclohexane remained unchanged. The para-cymene may be readily separated from the cyclohexane by conventional solvent extraction systems.

Example III 1,1,2,3-tetramethylhydrohexane was subjected to contact with a platinum-alumina catalyst at 250° C. and at 300° C. At 250° C. no dehydrogenation occurred, while at 300° C. 40% was converted to 1,2,3-trimethylbenzene and a gas fraction consisting of about 70% hydrogen and 30% methane.

We claim as our invention:

1. A process for separating a gem alkyl cyclohexane from a mixture thereof with a non-gem alkyl cyclohexane which comprises subjecting said mixture to dehydrogenation in the presence of a platinum catalyst at a temperature below about 275° C. to form an aromatic hydrocarbon from said non-gem alkyl cyclohexane and to leave said gem alkyl cyclohexane substantially unchanged, and thereafter separating said aromatic hydrocarbon from said gem alkyl cyclohexane.

2. The process of claim 1 further characterized in that said gem and said non-gem alkyl cyclohexanes comprise methyl cyclohexanes.

3. The process of claim 1 further characterized in that said gem alkyl cyclohexane comprises 1,1,2,3-tetramethylcyclohexane and said non-gem alkyl cyclohexane comprises 1-methyl-4-isopropylcyclohexane.

4. The process of claim 1 further characterized in that said gem alkyl cyclohexane comprises 1,1,3-trimethylcyclohexane.

5. The process of claim 1 further characterized in that said gem alkyl cyclohexane comprises 1,1,2,3-tetramethylcyclohexane.

6. A process for separating a gem alkyl cyclohexane from a mixture thereof with a non-gem alkyl cyclohexane which comprises subjecting said mixture to dehydrogenation in the presence of a dehydrogenation catalyst at a temperature at which substantially only said non-gem alkyl cyclohexane is dehydrogenated to form an aromatic hydrocarbon and said gem alkyl cyclohexane is left substantially unchanged, and thereafter separating said aromatic hydrocarbon from said gem alkyl cyclohexane.

7. The process of claim 6 further characterized in that said alkyl cyclohexanes comprise methyl cyclohexanes.

VLADIMIR N. IPATIEFF.
HERMAN PINES.

REFERENCES CITED

The following references are of record in the file of this patent:

Linstead et al. (A), "Dehydrogenation. Part I," Jour. Chem. Soc. (1937), pages 1146–47 (2 pages), Patent Office Library, 260–668.

Linstead et al. (B), "Dehydrogenation. Part II, Elimination and . . . dehydrogenation," Jour. Chem. Soc. (1940), pages 1127–1134 (8 pages), Patent Office Library; also Chem. Abst., vol. 34 (1940), Col. 7888, 7889 (2 pages), Patent Office Library, 260–668.